United States Patent
Ali et al.

(10) Patent No.: US 11,258,607 B2
(45) Date of Patent: Feb. 22, 2022

(54) CRYPTOGRAPHIC ACCESS TO BIOS

(71) Applicant: HEWLETT-PACKARD DEVELOPMENT COMPANY, L.P., Spring, TX (US)

(72) Inventors: Valiuddin Ali, Spring, TX (US); Jeffrey Kevin Jeansonne, Spring, TX (US); Giridhar Busam, Ballwin, MO (US); Karthick Periyakulam Tharakraj, Spring, TX (US); Richard Alden Bramley, Jr., Mansfield, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 59 days.

(21) Appl. No.: 16/775,871

(22) Filed: Jan. 29, 2020

(65) Prior Publication Data

US 2021/0234700 A1    Jul. 29, 2021

(51) Int. Cl.
  *H04L 29/06* (2006.01)
  *H04L 9/08* (2006.01)
  *H04L 9/32* (2006.01)

(52) U.S. Cl.
  CPC .......... *H04L 9/3226* (2013.01); *H04L 9/0891* (2013.01); *H04L 9/0894* (2013.01); *H04L 9/3213* (2013.01); *H04L 9/3271* (2013.01); *H04L 63/104* (2013.01)

(58) Field of Classification Search
  CPC ... H04L 9/3226; H04L 9/0891; H04L 9/0894; H04L 9/3213; H04L 9/3271; H04L 63/104
  See application file for complete search history.

(56) References Cited

U.S. PATENT DOCUMENTS

| | | | |
|---|---|---|---|
| 9,213,825 B1 | 12/2015 | Gysin et al. | |
| 9,390,248 B2 | 7/2016 | Halibard | |
| 9,519,784 B2 | 12/2016 | Graham | |
| 2006/0041932 A1* | 2/2006 | Cromer | H04L 9/0897 726/6 |
| 2009/0036096 A1* | 2/2009 | Ibrahim | H04L 9/3213 455/411 |
| 2013/0212151 A1* | 8/2013 | Herbach | H04L 67/42 709/203 |
| 2014/0136828 A1* | 5/2014 | Lewis | G06F 9/4416 713/2 |

(Continued)

FOREIGN PATENT DOCUMENTS

EP    3545437 A1    10/2019

*Primary Examiner* — Mohammad A Siddiqi
(74) *Attorney, Agent, or Firm* — Perry + Currier Inc.

(57) ABSTRACT

An example computing device includes a memory to store a cryptographic key, a processor coupled to the memory, and a set of instructions stored in the memory. The set of instructions, when executed by the processor, is to capture an encrypted passcode originating from a basic input/output system (BIOS) of a managed device as a challenge to grant local access to the BIOS and authenticate with a server using a user credential. When authentication with the server is successful, the set of instructions is to decrypt the encrypted passcode with the cryptographic key to obtain a decrypted passcode and output the decrypted passcode. When authentication with the server is unsuccessful, the set of instructions is to delete the cryptographic key.

15 Claims, 7 Drawing Sheets

(56) References Cited

U.S. PATENT DOCUMENTS

| | | | | |
|---|---|---|---|---|
| 2016/0342800 | A1* | 11/2016 | Ma | H04L 9/0863 |
| 2017/0041145 | A1* | 2/2017 | Sinchak | H04L 9/0872 |
| 2019/0243714 | A1* | 8/2019 | Foxworth | G06F 21/79 |
| 2019/0385197 | A1* | 12/2019 | Seneewongs | G06Q 30/0277 |
| 2021/0044976 | A1* | 2/2021 | Avetisov | H04L 63/18 |

* cited by examiner

CRYPTOGRAPHIC ACCESS TO BIOS

BACKGROUND

Computing devices, such as desktop computers, notebook computers, servers, tablet computers, and smartphones, often include a basic input/output system (BIOS) stored in non-volatile memory. When a computing device is booted, the BIOS may initialize hardware of the computing device and start runtime services that may be used by an operating system or application executed by the computing device.

A BIOS may be configured to initialize hardware and execute other boot processes based on the selection of various firmware settings for a computing device.

DETAILED DESCRIPTION

Figure 1:
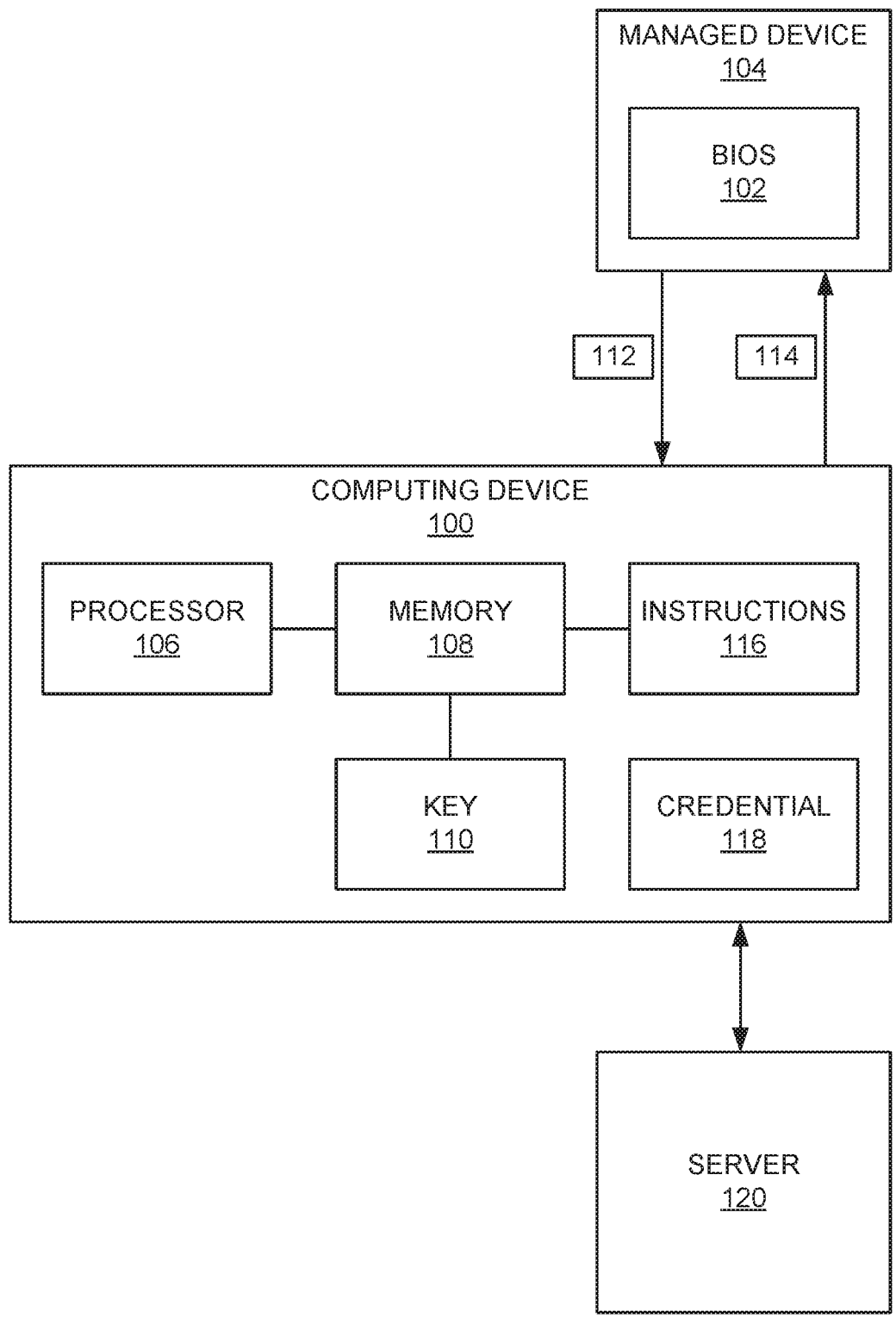
FIG. 1 is a block diagram of an example computing device with cryptographic access to a BIOS of a managed device, in which a cryptographic key is deleted when the computing device fails to authenticate with a server.

A BIOS may be modified by a user who has local physical access to the device. A user may be a tech support person who manages a plurality of managed devices. A user may wish to modify a BIOS of a managed device for various reasons to ensure that the managed device operates as expected.

Unauthorized users are prevented from accessing the BIOS of a managed device. A user who is attempting to locally access the BIOS of a managed device is first authenticated by a server. Successful authentication allows the user to proceed with access to the BIOS. The user's access may be revoked at the server and as such, unsuccessful authentication prevents the user from accessing the BIOS of the managed device.

The managed device issues a challenge to a user who attempts local access to its BIOS. The user has a computing device, such as a smartphone, that contains a cryptographic key that generates a response to the challenge. The user may thus use their computing device to answer the challenge and access the BIOS.

Before the computing device generates the response to the challenge, the computing device performs an authentication with a server. A user of the computing device may be authenticated, the computing device may be authenticated, or both the user and the computing device may be authenticated. Failure to authenticate triggers the computing device to delete the cryptographic key and thus prevents generation of the response to the challenge, thereby denying access to the BIOS of the managed device. This allows distributed and ad hoc local access to the BIOS of managed devices to be administered centrally.

In addition to authentication, the computing device may also determine with the server if the user is authorized to access all or a particular part of BIOS. That is, a user may have been successfully authenticated (meaning he/she is part of the organization) but may not have authorization to access BIOS for modification purposes. This allows administrators to completely revoke BIOS modification access by a user and/or device, whereas authorization may be used to adjust permission levels to access various BIOS settings.

In another example, the cryptographic key is stored at a server and failure to authenticate the user and/or computing device, or to obtain authorization for the user, denies the computing device access to the cryptographic key.

As used herein BIOS refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

FIG. 1 shows an example computing device 100. The computing device 100 may be a smartphone, notebook computer, tablet computer, or similar portable device. The computing device 100 may be used to modify a BIOS 102 of a managed device 104, which may be a desktop computer, notebook computer, server, tablet computer, smartphone, or similar device, when the computing device 100 is physically local or proximate to the managed device 104. The computing device 100 may be carried by a tech support person, who may be responsible for managing a plurality of managed devices 104. For example, a tech support person may be dispatched to a managed device 104 to modify its BIOS 102 to correct a malfunction, change functionality, or perform an upgrade.

Modification of a BIOS 102 may include changing a setting of the BIOS, adding a function to the BIOS, removing a function from the BIOS, modifying a function of the BIOS, updating the BIOS, replacing the BIOS, or similar.

Example BIOS functions and settings include a selection of a boot device (e.g., hard drive, external memory device, network, etc.), a boot device order, a CPU operating frequency, an operating voltage, peripheral device settings, display settings, power management settings, fan/cooling settings, wake-on-LAN, and similar.

The computing device 100 includes a processor 106 and memory 108 coupled to the processor 106. The computing device 100 may include other components not illustrated for sake of clarity, such as a camera, power supply, display, user interface device, keyboard, and the like.

The processor 106 may include a central processing unit (CPU), a microcontroller, a microprocessor, a processing core, a field-programmable gate array (FPGA), an application-specific integrated circuit (ASIC), or a similar device capable of executing instructions. The memory 108 may include a non-transitory machine-readable medium that may be an electronic, magnetic, optical, or other physical storage device that encodes instructions. The non-transitory machine-readable medium may include, for example, random access memory (RAM), read-only memory (ROM), flash memory, a storage drive, an optical device, or similar.

The memory 108 stores a cryptographic key 110, such as a private key of an asymmetric cryptographic scheme (e.g., RSA or Rivest-Shamir-Adleman, elliptic curve, etc.).

The computing device 100 uses the cryptographic key 110 to access the BIOS 102 of the managed device 104 when the computing device 100 is physically local to the managed device 104, so that the computing device 100 may initiate a modification to the BIOS 102. For example, the managed device 104 may issue a challenge 112, request a response 114, and grant access to the BIOS 102 on the basis of the response 114. An example challenge includes displaying a code at a display device of the managed device 104. An example response may be accepted via a user input device of the managed device 104, for example, by typing in a corresponding code that answers the challenge.

The computing device 100 uses the cryptographic key 110 to obtain the response to the challenge. For example, the managed device 104 may use a public key to generate the challenge and, if the cryptographic key 110 is the corresponding private key, the computing device 100 may generate a suitable response.

The memory 108 stores a set of instructions 116 that are executable by the processor 106. The instructions 116 use the cryptographic key 110 to access the BIOS 102 of the managed device 104, for example, as discussed above.

The instructions 116 further authenticate a user credential 118 of the computing device 100 with another computing device, such as a server 120, as a condition for using the cryptographic key 110 to access the BIOS 102 of the managed device 104. The user credential 118 may be stored in the memory 108 of the computing device 100 and may be used to establish whether the user of the computing device 100 is authorized to modify the BIOS 102 of the managed device 104. The user credential 118 may be stored in the memory 108 temporarily after the credential 118 (e.g., username and password) has been entered by the user through a user input device, such as a touchscreen or keyboard. The server 120 may control such authorization on the basis of authenticating the credential. The user credential 118 may be revoked to render the user of the computing device 100 unauthorized to modify the BIOS 102 of the managed device 104. As such, an attempt by the instructions 116 to authenticate the user credential 118 may fail and, in response, the instructions 116 may refrain from using the cryptographic key 110 to decode a challenge received from the managed device 104. Further, the instructions 116 may delete the cryptographic key 110 if authentication with the server 120 is unsuccessful, so that further attempted unauthorized use of the cryptographic key 110 may be avoided. Deletion of the cryptographic key 110 may be automatic and without user intervention.

The user credential 118 may include or be associated with user identity data. Authentication with the server 120 may use further use the identity data. For example, a username and password may provide both a credential and identity data. Identity data may associate the user credential 118 to a user group to which the cryptographic key 110 is associated. User groups may be maintained at the server 120. The instructions 116 may delete the cryptographic key 110 in response to the server 120 determining that the user credential is not a member of the user group associated with the cryptographic key 110.

Authorization to use the key 110 may be separate from authentication. For example, the credential 118 may be authenticated but may not be associated with the group to which the key 110 belongs. As such, the user bearing the credential 118 may not be authorized to use the key 110. As such, the instructions 116 delete the cryptographic key 110 in response to the server 120 determining that the user is not authorized to use the key 110 by, for example, not being associated with the same group as the credential 118.

Deletion of the cryptographic key 110 may be performed at the computing device 100 in response to a command made by the server 120. The server 120 may operate an active directory that provisions the key 110 to the computing device 100. As such, removal of the user of the computing device 100 from the active directory may result in a command from the server 120 to delete the key 110.

The server 120 may include a cloud-based directory provider, such as Azure Active Directory™ (AAD), a Light Weight Directory Access Protocol Server (LDAP Server), a cloud-based Identity Provider (IDP) that may provide direct or federated identity verification, or similar.

Figure 2:
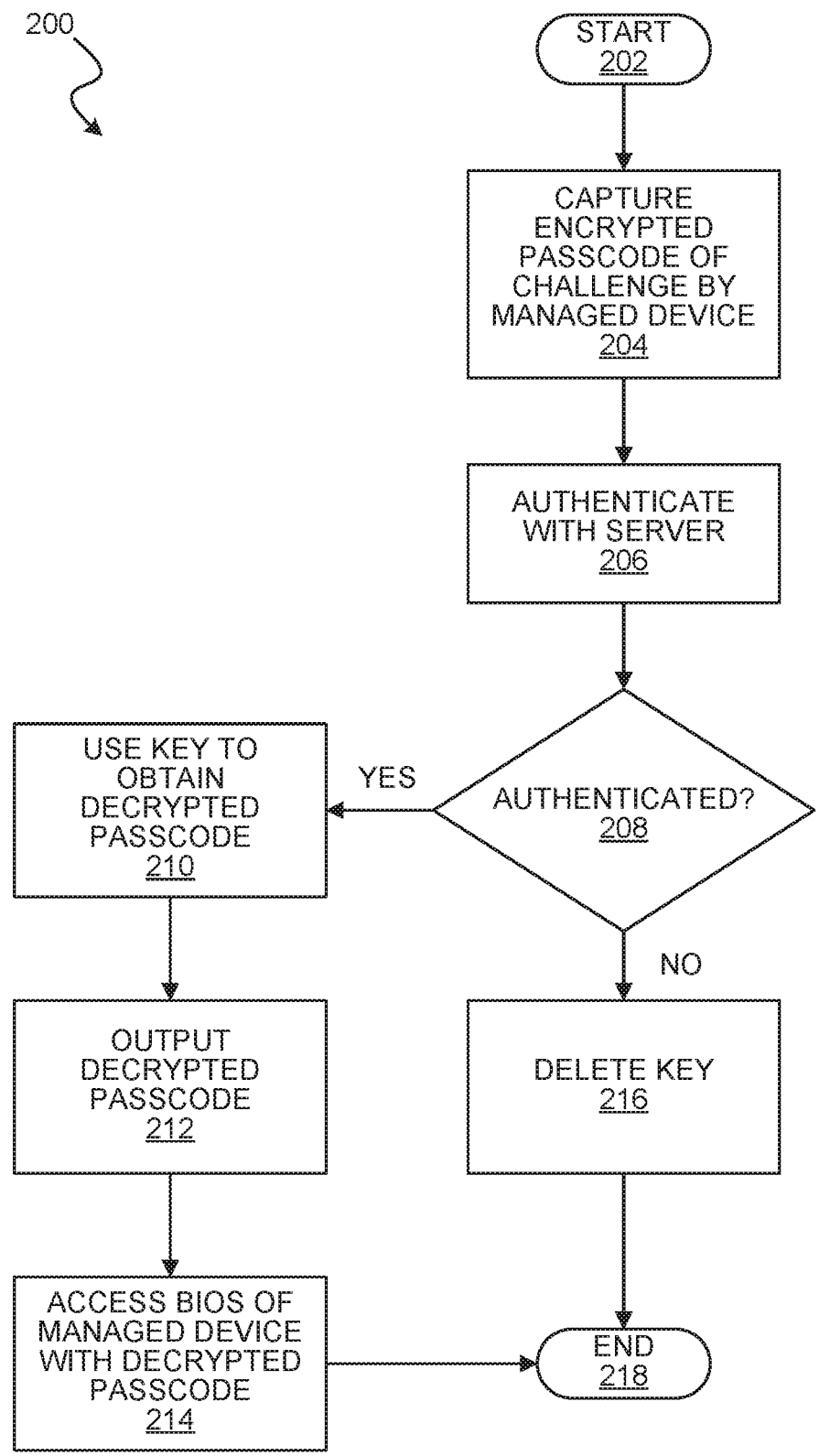
FIG. 2 is a flowchart of an example method of a computing device authenticating with a server to determine whether a cryptographic key is to be used to access to a BIOS of a managed device or is to be deleted.

FIG. 2 shows an example method 200 to grant a computing device local access to a BIOS of a managed device. The method 200 may be embodied by a set of instructions (e.g., instructions 116 of FIG. 1) that may be stored in a non-transitory computer-readable medium and executed by a processor. The method 200 begins at block 202.

At block 204, an encrypted passcode originating from a BIOS of a managed device is captured by the computing device that is near the managed device. The encrypted passcode is a challenge issued by the managed device to grant local access to the BIOS. The encrypted passcode may be generated by a cryptographic key, such as a public key, at the managed device. The encrypted passcode may be displayed by the managed device, for example, as a quick response (QR) code. The computing device may capture the encrypted passcode using a camera. Other examples of localized output of an encrypted passcode include Bluetooth™ communication, near-field communication (NFC), infrared communication, Wi-Fi, and similar.

It should be noted that a passcode, as discussed herein, is any human-intelligible information that may be manually entered into a computer. A passcode may include a personal identification number (PIN), a string of alphabetic and/or numeric characters, or similar. A passcode may be outputted as a QR code, barcode, image, text, or similar. A passcode may be dynamically generated when a challenge is to be issued and is not intended to be reused. A passcode may be generated from a timestamp or other source of entropy. A passcode may be referred to as a one-time password or passcode. A passcode may be encrypted to obtain an encrypted passcode, which may or may not be human-intelligible. An encrypted passcode may be decrypted to obtain a decrypted passcode that, if the correct decryption key was used, is the same at the original passcode prior to undergoing encryption.

At block 206, the computing device authenticates with a server using a user credential. The user credential may include a username, password, certificate, or other data stored by or entered into the computing device. For example, the computing device may connect to the server and the server may request a username and password to authenticate. The server may also determine the authorization of the computing device in addition to authenticating the credential. For example, different cryptographic keys may be associated with different user groups, and the server may determine which, if any, cryptographic keys the user of the computing device is authorized to access based on group membership.

At block 208, when authentication with the server is successful, the computing device decrypts the encrypted passcode using a cryptographic key, such as a private key that corresponds to the public key at the managed device, to obtain a decrypted passcode, at block 210. Block 208 may also include determining whether the user is authorized to use the cryptographic key based on group membership.

At block 212, the computing device outputs the decrypted passcode. The computing device may output the decrypted passcode at a user interface, such as by displaying the decrypted passcode at a display device, such as a smartphone screen. As such, the user of the computing device may view the decrypted passcode and enter the decrypted passcode into the managed device as a response to the challenge. If managed device determines that the entered decrypted passcode matches the decrypted passcode stored at the managed device, then the managed device grants access to the BIOS, at block 214. For example, a local user's smartphone, after capturing the OR code, may decrypt the decrypted passcode conveyed by the QR code and display the resulting decrypted passcode to the user, so that the user may type the decrypted passcode into the managed device to gain access to its BIOS.

When authentication with the server is unsuccessful, at block 208, the computing device deletes the cryptographic key, at block 216. This prevents the computing device from decrypting the encrypted passcode and thereby prevents the user of the computing device from accessing the BIOS of the managed device. For example, the user credential may be revoked and therefore the user of the computing device may no longer be authorized to access the BIOS of the managed device. In another example, the user may be removed from a user group associated with the cryptographic key, so that the user's permission to use the key is revoked.

The server may generate a deletion command and transmit the deletion command to the computing device on determining that the provided user credential has been revoked. The computing device may receive the deletion command from the server and delete the cryptographic key in response to receiving the deletion command, at block 216. Accordingly, future attempts to use the key may be prevented, thereby increasing security to the BIOS of the managed device.

The method 200 ends at block 218.

Figure 3:
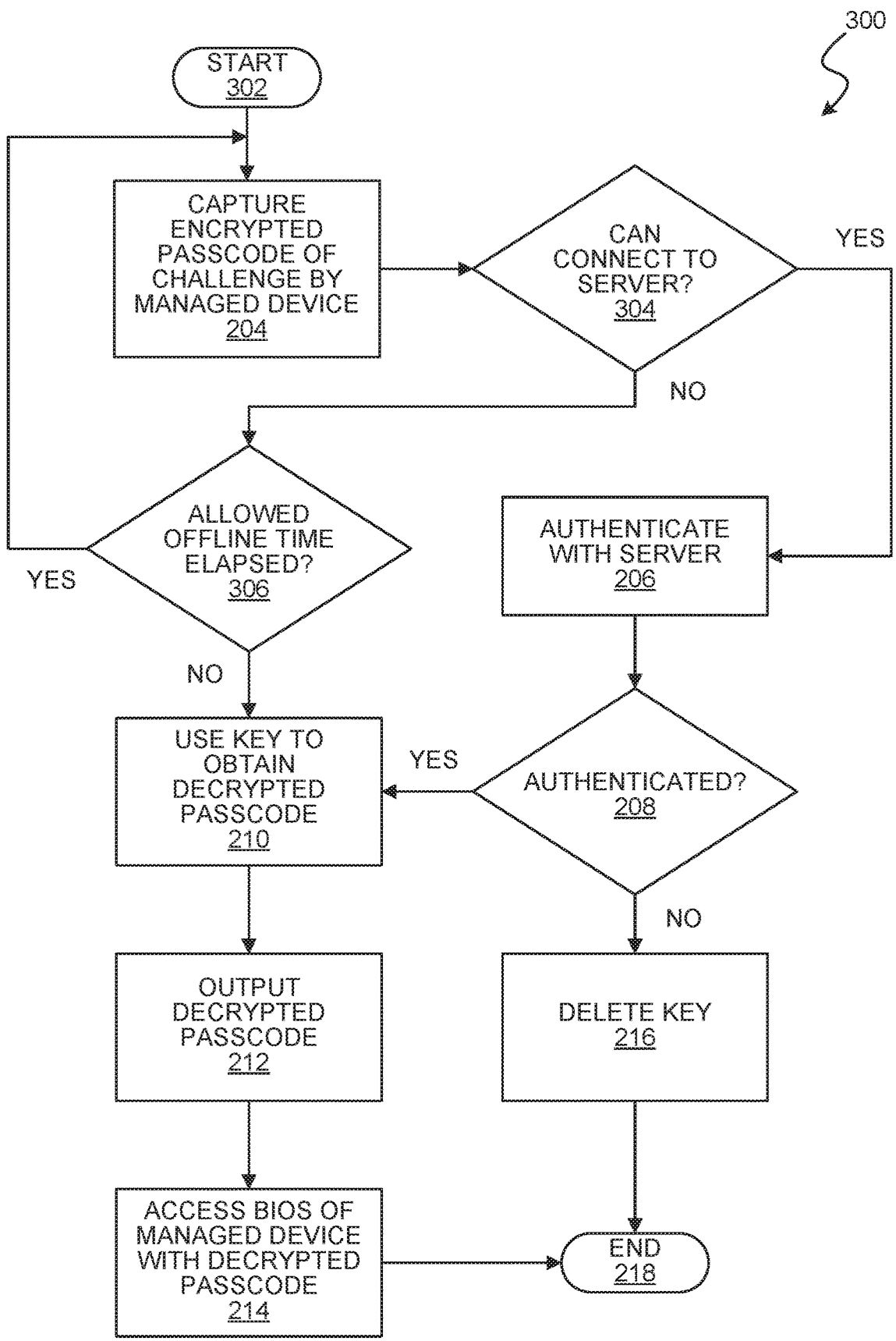
FIG. 3 is a flowchart of an example method of a computing device using a cryptographic key to access to a BIOS of a managed device for an allowed offline time without authentication with a server.

FIG. 3 shows an example method 300 to grant a computing device local access to a BIOS of a managed device. The method 300 may be embodied by a set of instructions (e.g., instructions 116 of FIG. 1) that may be stored in a non-transitory computer-readable medium and executed by a processor. The method 200 may be referenced for details not repeated below, with like reference numerals denoting like blocks. The method 300 begins at block 302.

After capture of an encrypted passcode from a managed device, at block 204, a computing device being used to gain access to the BIOS of the managed device attempts to connect to a server, at block 304.

If the computing device is able to connect to the server, then authentication is attempted and the cryptographic key is used to grant access to the BIOS of the managed or is deleted, accordingly, at blocks 206-218.

If the computing device is unable to connect to the server, then the cryptographic key may still be used for an allowed offline time. This may be useful if the computing device temporarily loses connectivity to the server. The allowed offline time may be selected according to expected connectivity in the physical environment of the managed device. Example allowed offline times include 5 minutes, 30 minutes, and 2 hours.

At block 306, it is determined whether an allowed offline time has elapsed. If the allowed offline time has elapsed, then the method 300 may restart and another attempt may be made to connect to the server for authentication. That is, the computing device may be forced to authenticate with the server after the offline time during which the computing device did not access to the server.

If the allowed offline time has not elapsed, at block 306, then the cryptographic key may be used to decrypt the encrypted passcode without authentication by the server. As such, the BIOS of the managed device may be accessed during the allowed offline time. This may allow for temporary access to the BIOS of managed devices at locations where network connectivity is weak, while retaining control over access by limiting the allowed offline time.

Figure 4:
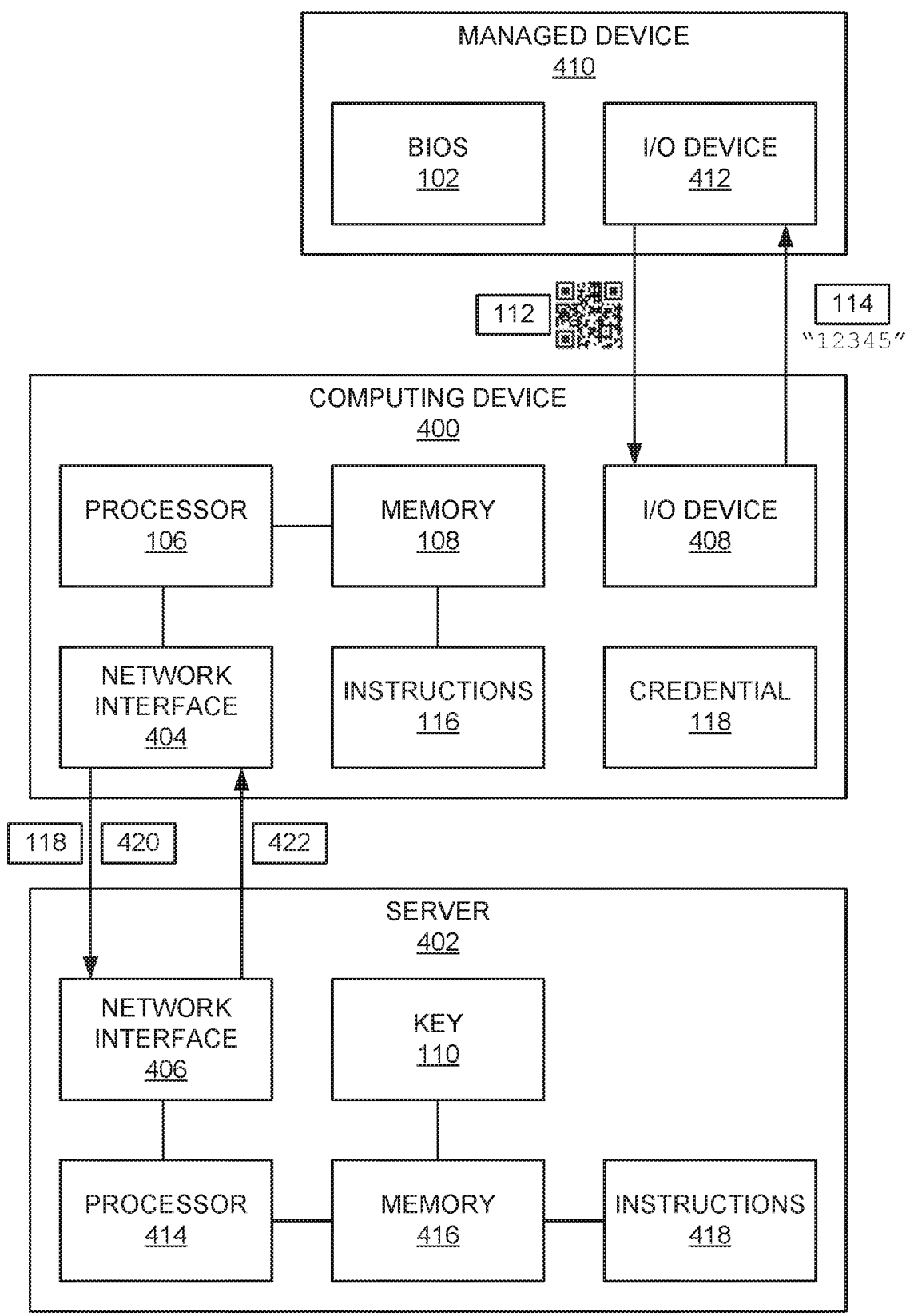
FIG. 4 is a block diagram of an example server to provide access to a cryptographic key that allows a computing device to access a BIOS of a managed device.

FIG. 4 shows an example computing device 400 and an example server 402 to provide a decrypted passcode to access a BIOS of a managed device. The computing device 100 and server 120 of FIG. 1 may be referenced for details not repeated below, with like reference numerals and terminology denoting like components.

The computing device 400 includes a network interface 404 to communicate via a network with a network interface 406 of the server 402.

Each network interface 404, 406 allows for connection to a local-area network, wide-area network, the internet, or similar computer network to facilitate communication between the computing device 400 and the server 402. An example network interface 404, 406 includes a network interface device, such as a network card or chipset, at a computing device. The network interface device provides physical access to a computer network using wired or wireless signals. The computing device may include a driver that controls operation of the network interface device. Various protocols, such as Transmission Control Protocol (TCP), Internet Protocol (IP), User Datagram Protocol (UDP), and similar may be used to facilitate data communications.

The computing device 400 further includes an input/output device 408, such as a camera, display device, keyboard, or similar, coupled to the processor 106. Any number and type of input/output devices 408 may be provided. For example, a camera may be used to capture a challenge 112 (e.g., a QR code) issued by a managed device 410 via an input/output device 412, such as a display, of the managed device 410. Subsequently, the user may provide a response 114 (e.g., a typed text string) to the challenge 112 at an input/output device 412, such as a keyboard, of the managed device 410.

The server 402 is a computing device that includes a processor 414 and a memory 416. The memory 416 stores a cryptographic key 110 that is used to respond to the challenge 112 issued by the managed device 410.

The memory 416 stores instructions 418 that use the cryptographic key 110 to provide the computing device with a response 114 to the challenge 112. The instructions 418 receive an encrypted passcode 420 from the computing device 400, where such encrypted passcode originates from the managed device 410. The instructions 418 further receive a user credential 118 from the computing device 400, authenticate the user credential 118, and use the cryptographic key 110 to decrypt the encrypted passcode 420 when authentication is successful. The instructions 418 then return a decrypted passcode 422 to the computing device 400, so that the computing device 400 may output the decrypted passcode 422 for access to the BIOS 102 of the managed device 410.

When authentication is unsuccessful, the instructions ignore the encrypted passcode 420, thereby effectively denying access to the BIOS 102 of the managed device 410.

In addition, authorization may be used as a condition for the server 402 to return the decrypted passcode 422. For example, group membership may be checked. When the credential 118, or identity data thereof, is determined to belong to the same group as the key 110, then the server 402 provides the decrypted passcode 422. When the credential 118, or identity data thereof, is determined to not belong to the same group as the key 110, then the server 402 ignores the encrypted passcode 420.

Figure 5:
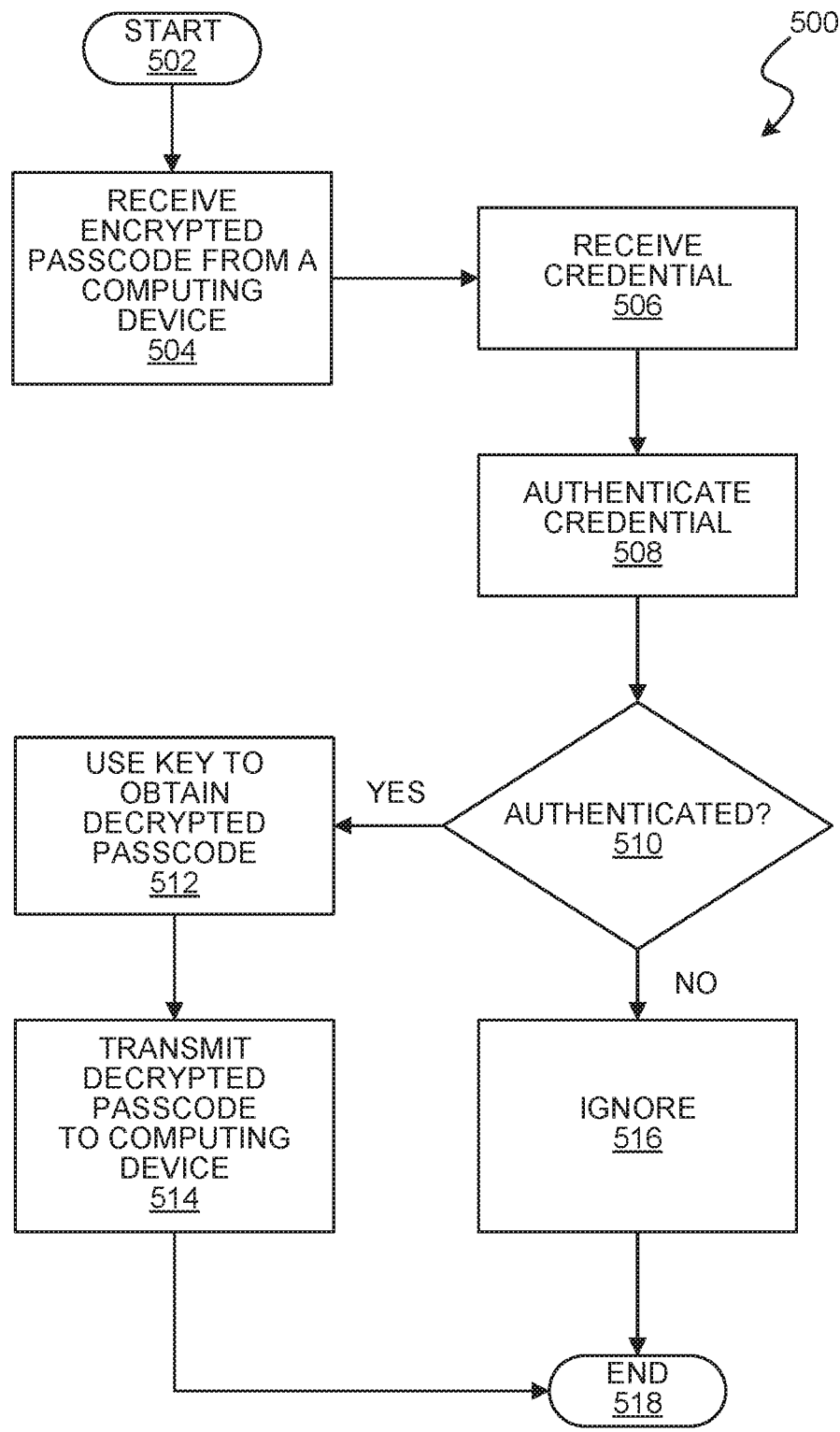
FIG. 5 is a flowchart of an example method to provide access to a cryptographic key that allows a computing device to access a BIOS of a managed device.

FIG. 5 shows an example method 500 to grant a computing device local access to a BIOS of a managed device using a key held by a server. The method 500 may be embodied by a set of instructions (e.g., instructions 418 of FIG. 4) that may be stored in a non-transitory computer-readable medium and executed by a processor. The method 500 begins at block 502.

At block 504, the server receives an encrypted passcode from a computing device. The encrypted passcode originates from a challenge issued by a managed device, the computing device having captured the challenge to gain access to the BIOS of the managed device.

At block 506, the server receives a user credential from the computing device. The user credential may include a username, password, certificate, or similar credential that the server may use to authenticate the user of the computing device. The credential may be received in the same request/communication as the encrypted passcode or in a different request/communication.

At block 508, the server performs an authentication of the user credential to determine whether the user of the computing device is permitted to access the BIOS of the managed device. Authorization, for example with respect to user groups, may also be performed at block 508.

When the authentication is successful, at block 510, the server decrypts the encrypted passcode with a cryptographic key to obtain a decrypted passcode, at block 512, and transmits the decrypted passcode to the computing device, at block 514. The user of the computing device may thus use the decrypted passcode to gain access to the BIOS of the managed device.

When authentication is unsuccessful, at block 516, the server ignores the encrypted passcode. As such, the decrypted passcode is provided to the computing device and the user of the computing device is thereby preventing from accessing the BIOS of the managed device.

The method 500 ends at block 518.

Figure 6:
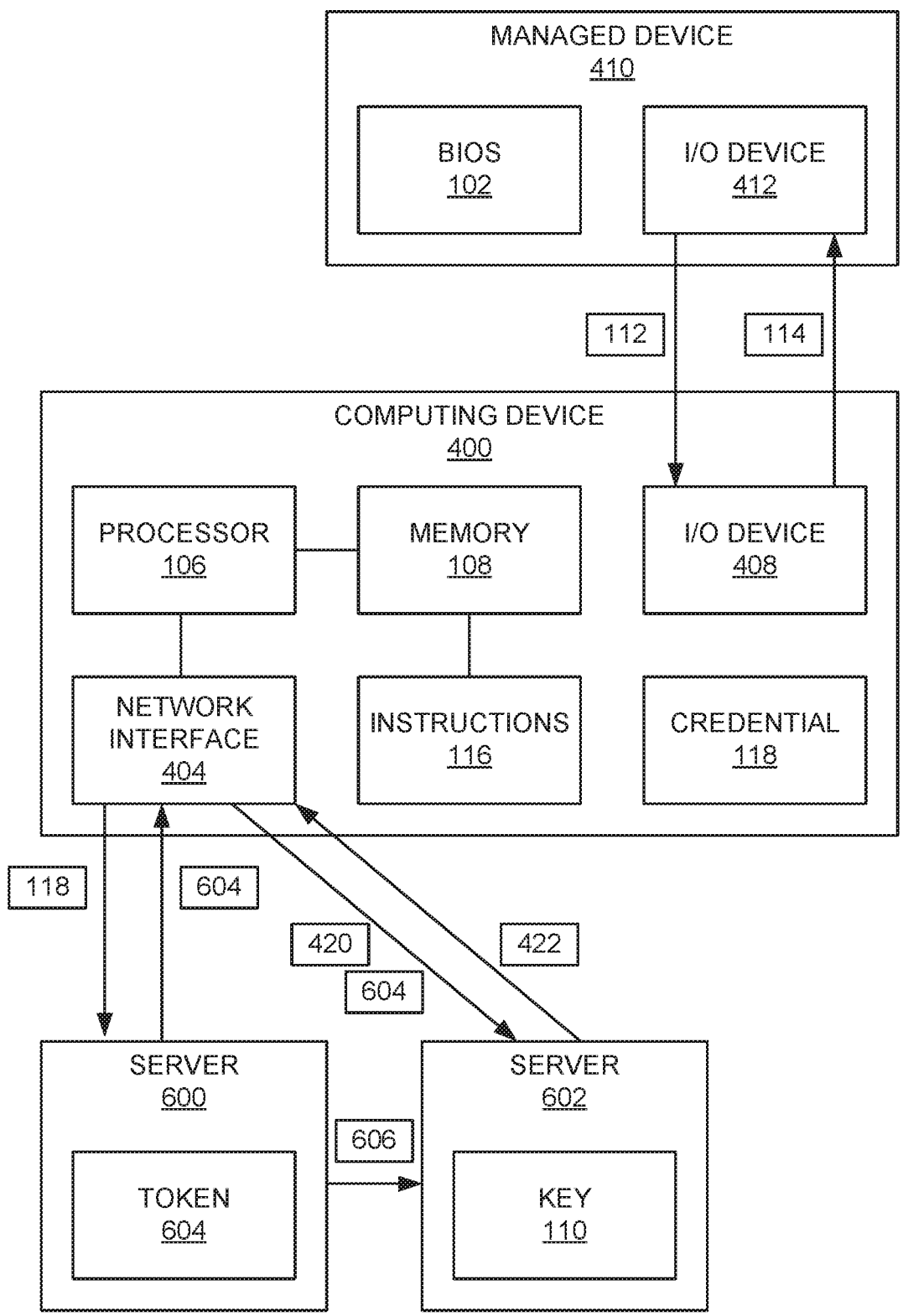
FIG. 6 is a block diagram of example servers to provide access to a cryptographic key that allows a computing device to access a BIOS of a managed device.

FIG. 6 shows an example computing device 400 and example servers 600, 602 to provide a decrypted passcode to access a BIOS of a managed device. The computing device 400 and server 402 of FIG. 4 may be referenced for details not repeated below, with like reference numerals and terminology denoting like components.

A first server 600 performs authentication of the computing device 400 and a second server 602 provides a decrypted passcode to the computing device 400. Each server 600, 602 includes a processor, memory, and instructions to carry out the functionality discussed below.

The first server 600, or authentication server, receives a user credential 118 from the remote computing device 400 when the remote computing device 400 is in physical proximity to a managed device 410 whose BIOS 102 is to be accessed. The first server 600 performs an authentication of the user credential 118. When the authentication of the user credential 118 is successful, the first server 600 transmits a token 604 to the computing device 400. The first server 600 may also determine the authorization of the computing device 400, separate from the authentication, as a condition for transmitting the token 604.

The token 604 grants the remote computing device 400 access to a cryptographic key 110 held by the second server 602. The first server 600 transmits an instruction 606 to the second server 602 to allow the second server 602 to transmit the cryptographic key 110 to the computing device 400 is response to presentation of the token 604. That is, the first server 600 shares the token 604 or information thereof with the second server 602 to authorize use of the key 110 by the computing device 400.

When the authentication of the user credential 118 is unsuccessful, the first server 600 ignores the request by the computing device 400, thereby preventing the token 604 from being used to access the cryptographic key 110 by the computing device 400.

The second server 602, or key server, receives an encrypted passcode 420 from the computing device 400. The encrypted passcode 420 originates from a challenge issued by the managed device 410 whose BIOS 102 is to be accessed. When the computing device 400 has been authenticated, the second server 602 also receives a token 604 from the computing device 400. The second server 602 uses the token 604 to determine that use of the cryptographic key 110 is authorized and decrypts the encrypted passcode 420 to obtain a decrypted passcode 422. The second server 602 transmits the decrypted passcode 422 to the computing device 400, so that a user of the computing device 400 may enter a response 114 to the challenge 112 issued by the managed device 410 to gain access to the BIOS 102.

Figure 7:
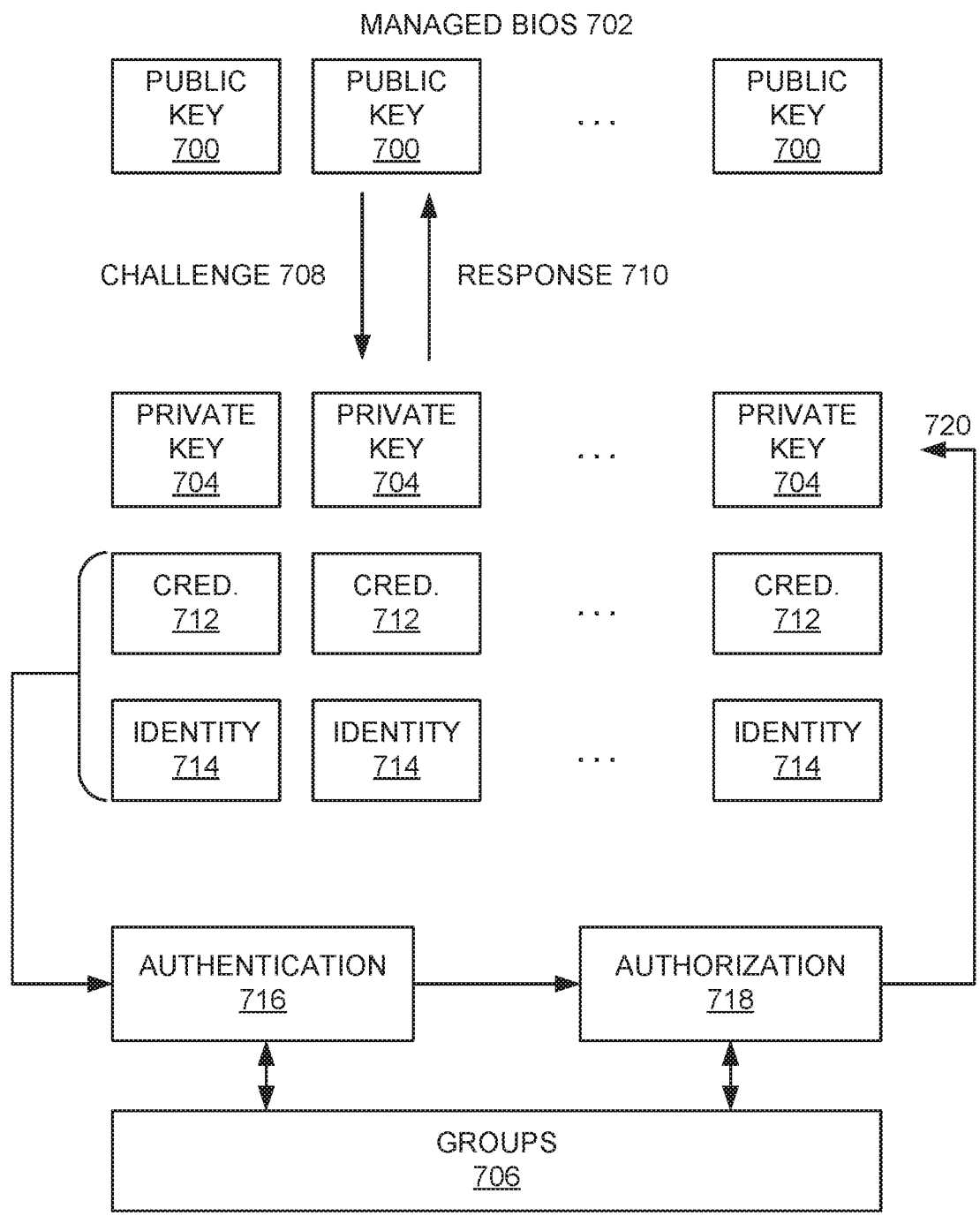
FIG. 7 is a schematic diagram of example relationships among cryptographic keys and other information that provide access to BIOS of managed devices.

FIG. 7 shows example relationships among cryptographic keys and other information that grant access to BIOS of managed devices.

A plurality of public keys 700 are distributed to BIOS 702 of managed devices. A particular public key may be associated with a particular managed device or group thereof, a particular BIOS function/setting, a particular user group, or a combination of such. Accordingly, each BIOS may have any number of access pathways guarded by any number of public keys 700.

A plurality of private keys 704 are provisioned to a plurality of computing devices or a server to which the computing devices may access. Users tasked with managing the BIOS 702 carry the computing devices and use the computing devices to access the BIOS 702 when in local vicinity to the managed devices. A particular computing device may store any number of private keys 704 or may be provided access to any number of private keys 704 when the private keys 704 are stored at a server.

The public keys 700 and private keys 704 are distributed based on management decisions pertaining to the BIOS 702 of managed devices. User groups 706 may be established and different pairs of keys 700, 704 may be associated with different user groups 706. For example, tech support may be divided into three groups: low security, medium security, and high security. The most trusted tech support users may be given access to the private keys 704 associated with high security BIOS 702 installations.

Access to the BIOS 702 is through a challenge 708 and response 710 methodology. A challenge 708 may be triggered when a tech support user attempts to access a BIOS 702 or a function or setting thereof. The challenge 708 is based on the public key 700 associated with the BIOS 702, function, or setting thereof. The challenge 708 may indicate the public key 700 being used, so that the corresponding private key 704 can be identified. The response 710 to the challenge 708 is proof of access to or possession of the corresponding private key 704.

Tech support users who may have access to the private keys 704 are associated with credentials 712 and relevant identity data 714. A credential 712, identity data 714, or a combination of such may be used to authenticate 716 a particular user. Authentication 716 may implicitly authorize a particular user to process or access a particular private key 704. A separate authorization 718 may be determined when a particular credential 712, identity data 714, or combination of such may be associated with more than one group 706.

Authentication 716 and authorization 718, whether separate or implicit, of credentials 712 and identities 714 may be made against user groups 706, so that access to a particular private key 704 may be granted or denied or so that a particular private key 704 may be automatically deleted 720 from a tech support user's computing device when access is denied. As such, local access to BIOS 702 of managed devices may be controlled centrally and remote from the managed devices. Permission to access a private key 704 may be revoked, and the key 704 may be deleted from the device, when particular user is no longer a member of a group.

It should be apparent from the above that local access to managed device BIOS may be centrally controlled by way of a server that may deny access to or delete a cryptographic key when access is to be revoked. As such, a tech support user who leaves an organization or changes a user group may have their former access to managed device BIOS updated. The security risk posed by former employees, uncontrolled devices, or similar circumstances may be mitigated.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computing device comprising:
a memory to store a cryptographic key;
a network interface;
a processor coupled to the memory and the network interface; and
a set of instructions stored in the memory, wherein the set of instructions, when executed by the processor, is to:
when the computing device is local to a managed device, capture an encrypted passcode originating from a basic input/output system (BIOS) of the managed device as a challenge to grant local access to the BIOS;
transmit via the network interface a request to authenticate with a server using a user credential;
when receiving an indication via the network interface that the authentication with the server is successful, decrypt the encrypted passcode with the cryptographic key to obtain a decrypted passcode and output the decrypted passcode to grant access to the managed device; and
when authentication with the server is unsuccessful, delete the cryptographic key.

2. The computing device of claim 1, wherein the set of instructions is further to:
receive a deletion command from the server; and
delete the cryptographic key in response to receiving the deletion command.

3. The computing device of claim 1, wherein the set of instructions is further to:
authenticate with the server after an offline time during which the computing device did not have access to the server; and
during the offline time, decrypt the encrypted passcode without authentication by the server.

4. The computing device of claim 1, wherein:
the memory is further to store identity data associated with the cryptographic key; and
the set of instructions is to authenticate with the server using the user credential and the identity data.

5. The computing device of claim 4, wherein the identity data associates the user credential to a user group to which the cryptographic key is associated, wherein the set of instructions is further to delete the cryptographic key in response to the server determining that the user credential is not a member of the user group.

6. The computing device of claim 1, further comprising a camera to capture the encrypted passcode as displayed by the managed device.

7. The computing device of claim 1, further comprising a display device to output the decrypted passcode.

8. A computing device comprising:
a memory to store a cryptographic key;
a network interface;
a processor coupled to the memory and the network interface; and
a set of instructions stored in the memory, wherein the set of instructions, when executed by the processor, is to:
receive an encrypted passcode from a portable computing device via the network interface, the encrypted passcode originating from a basic input/output system (BIOS) of a managed device that locally provided the encrypted passcode to the portable computing device, the encrypted passcode being a challenge to grant local access to the BIOS;
receive via the network interface a user credential from the portable computing device;
perform an authentication of the user credential;
when the authentication is successful, decrypt the encrypted passcode with the cryptographic key to obtain a decrypted passcode and transmit the decrypted passcode to the portable computing device via the network interface to allow local access to the BIOS of the managed device; and
when authentication is unsuccessful, ignore the encrypted passcode.

9. The computing device of claim 8, wherein the set of instructions is further to:
receive identity data from the portable computing device; and
perform an authentication of the user credential with reference to the identity data.

10. The computing device of claim 9, wherein the identity data associates the user credential to a user group to which the cryptographic key is associated.

11. The computing device of claim 8, wherein the set of instructions is further to:
   determine an authorization of the portable computing device to decrypt the encrypted passcode.

12. The computing device of claim 11, wherein the authorization is determined based on membership to a user group.

13. A computing device comprising:
   a network interface; and
   a processor to:
      receive via the network interface a user credential from a remote computing device that is in physical proximity to a managed device;
      perform an authentication of the user credential;
      when the authentication of the user credential is successful, transmit a token to the remote computing device via the network interface, the token granting the remote computing device access to a cryptographic key to decrypt an encrypted passcode originating from the managed device to allow the remote computing device to access a basic input/output system (BIOS) of the managed device; and
      transmit via the network interface an instruction to a key server that is separate from the computing device to allow the key server to transmit the cryptographic key to the remote computing device based on the token.

14. The computing device of claim 13, wherein the processor is further to:
   when the authentication of the user credential is unsuccessful, ignore the encrypted passcode.

15. The computing device of claim 13, wherein the processor is further to:
   determine an authorization based on group membership separate from the authentication as a condition to transmit the instruction to the key server.

* * * * *